US012151552B2

(12) United States Patent
Watanuki

(10) Patent No.: US 12,151,552 B2
(45) Date of Patent: Nov. 26, 2024

(54) VEHICULAR SIDE STRUCTURE

(71) Applicant: HONDA MOTOR CO., LTD., Tokyo (JP)

(72) Inventor: Shigeru Watanuki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 217 days.

(21) Appl. No.: 17/786,236

(22) PCT Filed: Dec. 19, 2019

(86) PCT No.: PCT/JP2019/049966
§ 371 (c)(1),
(2) Date: Jun. 16, 2022

(87) PCT Pub. No.: WO2021/124534
PCT Pub. Date: Jun. 24, 2021

(65) Prior Publication Data
US 2023/0019341 A1 Jan. 19, 2023

(51) Int. Cl.
*B60K 15/05* (2006.01)
*B60J 1/10* (2006.01)
*B60R 13/04* (2006.01)

(52) U.S. Cl.
CPC ................. *B60K 15/05* (2013.01); *B60J 1/10* (2013.01); *B60R 13/04* (2013.01)

(58) Field of Classification Search
CPC ............. B60K 15/05; B60J 1/10; B60R 13/04
USPC ....................................................... 296/97.22
See application file for complete search history.

(56) References Cited

U.S. PATENT DOCUMENTS

| | | | | |
|---|---|---|---|---|
| 5,114,206 A * | 5/1992 | Yada | B60J 1/2002 296/93 |
| 2010/0025127 A1 | 2/2010 | Oyobe | |
| 2012/0139288 A1 | 6/2012 | Ohki et al. | |
| 2013/0206757 A1 | 8/2013 | Nagai et al. | |

FOREIGN PATENT DOCUMENTS

| | | |
|---|---|---|
| CN | 102485517 A | 6/2012 |
| DE | 10133416 A1 | 1/2003 |
| DE | 202011050412 U1 | 8/2011 |
| JP | S59-114351 U | 8/1984 |
| JP | 2003136976 A * | 5/2003 |
| JP | 2006-213184 A | 8/2006 |
| WO | 2008/111547 A1 | 9/2008 |

(Continued)

OTHER PUBLICATIONS

JP-2003136976-A (Toshishige M) (May 14, 2003) (Year: 2003).*

(Continued)

*Primary Examiner* — Mahmoud Gimie
(74) *Attorney, Agent, or Firm* — Rankin, Hill & Clark LLP

(57) ABSTRACT

A vehicular side structure includes a covering section that covers a refueling port provided in a vehicle and a window opening that communicates an inside and an outside of the vehicle. The window opening has a substantially linearly formed window opening lower end portion, and the window opening lower end portion and the covering section are positioned at the same height in an up-down direction, and the window opening is positioned above the covering section.

2 Claims, 3 Drawing Sheets

(56) References Cited

FOREIGN PATENT DOCUMENTS

WO 2012/049956 A1 4/2012

OTHER PUBLICATIONS

International Search Report by ISA/JP mailed on Mar. 10, 2020, on PCT/JP2019/049966, 2 pages.

Written Opinion by ISA/JP mailed on Mar. 10, 2020, on PCT/JP2019/049966, 4 pages.

Office Action received in corresponding CN application No. 201980102199.X dated Jun. 28, 2023, 5 pages.

* cited by examiner

VEHICULAR SIDE STRUCTURE

TECHNICAL FIELD

The present invention relates to a vehicular side structure.

BACKGROUND ART

A rear quarter window, a fuel lid, and the like are generally provided on the outer surface of a rear part of a vehicle (see, for example, Patent Literature 1).

As described in a vehicular gutter unit disclosed in Patent Literature 1, a quarter window (W) is generally disposed above a fuel lid (4). The quarter window (W) has its outer peripheral portion entirely surrounded by a molding (1) and attached to a rear window glass opening section.

It is conceivable that, by separating a refueling port covered with the fuel lid (4) from a fuel tank upward, fuel can be efficiently supplied to the fuel tank by the potential energy of the fuel. Therefore, it is desirable to dispose the refueling port as high as possible.

CITATION LIST

Patent Literature

Patent Literature 1: JPS59-114351U (FIGS. 1 and 3)

SUMMARY OF INVENTION

Technical Problem

However, there is a problem that, when the fuel lid (4) needs to be placed further above depending on the shape of the vehicle, the fuel lid (4) interferes with the quarter window (W) or the surrounding molding (1). Therefore, the fuel lid (4) cannot be easily disposed at a high position where the quarter window (W) is arranged.

The present invention has been devised in view of the above-mentioned matters, and it is an object thereof to provide a vehicular side structure in which a covering section that covers a refueling port can be disposed as high as the height of a window opening section.

Solution to Problem

To solve the above problems, in a vehicular side structure of the present invention, a vehicle includes a covering section that covers a refueling port provided in the vehicle, and a window opening that communicates the inside and outside of the vehicle, in which the window opening has a substantially linearly formed window opening lower end portion, and the window opening lower end portion and the covering section are positioned at the same height in an up-down direction, and the window opening section 1*s* positioned above the covering section.

Advantageous Effects of Invention

According to the present invention, it is possible to provide a vehicular side structure in which a covering section that covers a refueling port can be disposed as high as the height of a window opening section.

EMBODIMENTS OF THE INVENTION

Hereinafter, a vehicular side structure A according to an embodiment of the present invention will be described with reference to the drawings as appropriate. In the embodiment, it is assumed that "front" is the front side of a vehicle V, "rear" is the rear side of the vehicle V, "up" is the vertically upper side, "down" is the vertically lower side, and "right and left" is the vehicle width direction. The same components are denoted by the same reference signs, and repetitive description will be omitted.

<Vehicle>

First, prior to describing the vehicular side structure A according to the embodiment of the present invention, the vehicle V provided with the vehicular side structure A will be described.

Figure 1:
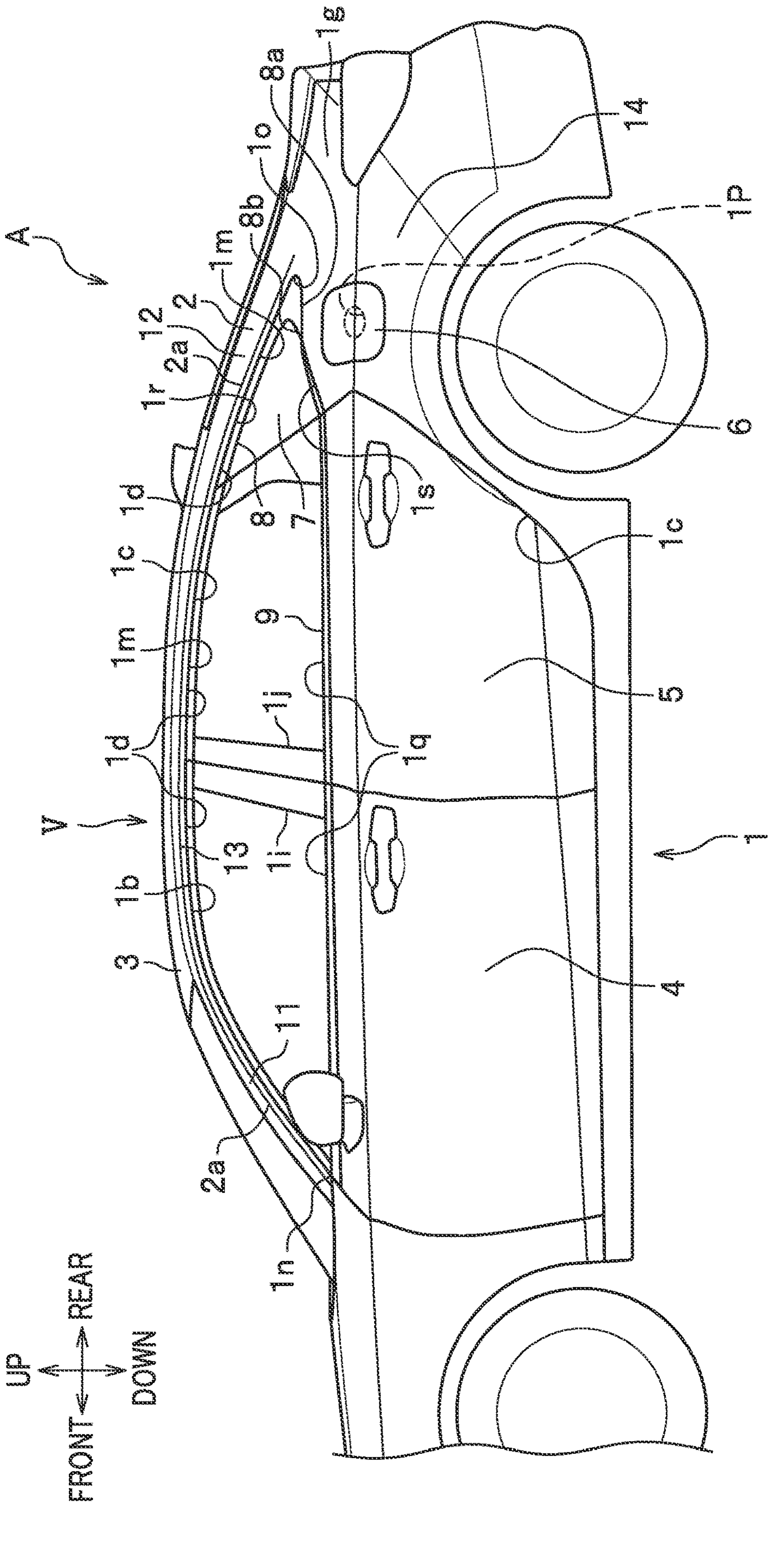
FIG. 1 is a schematic side view of a main part showing a vehicular side structure according to an embodiment of the present invention.

As shown in FIG. 1, the vehicle V is an automobile having, at least in a vehicle body side part 1*a*, a refueling port 1*p*, a fuel lid 6 (covering section) that covers the refueling port 1*p*, and a rear window glass opening section 1*m* that communicates the inside and outside of the vehicle V. The vehicle V is not particularly limited in type and shape. The vehicle V may be a 2-door type, a 3-door type, or a 4-door type as long as the vehicle has the rear window glass opening section 1*m*.

Hereinafter, the embodiment will be described as an example of the vehicle body side part 1*a* on the left side of a 4-door type passenger automobile having a front door 4, a rear door 5, and the like. Since the vehicular side structure A is formed substantially bisymmetrically, description of the driver's seat side (right side) will be omitted.

<Vehicle Body Side Structure>

As shown in FIG. 1, the vehicular side structure A is directed to form the vehicle body side part 1*a* on either 6 side of the vehicle body 1. The vehicular side structure A includes, for example, a side panel 2, a roof panel 3, the front door 4, the rear door 5, the fuel lid 6, a rear quarter window 7, a molding member 8, and a weather strip 9.

<Side Panel>

The side panel 2 is an outer panel member made of a high-strength steel plate or the like that forms an outer surface 1*g* of the vehicle body 1. In the side panel 2, a ridge line 2*a*, a front door opening section 1*b*, a rear door opening section 1*c*, the rear window glass opening 16 section 1*m*, the refueling port 1*p*, and the like are formed. The side panel 2 forms the outer surface 1*g* of a front pillar 11, a roof side rail 13, and a rear fender 14.

<Ridge Line>

The ridge line 2*a* is a ridge-shaped reinforcing portion formed by bending in a convex shape (mountain shape) in a vehicle outward direction when viewed in longitudinal section in order to reinforce the side panel 2. The ridge line 2*a* is formed from the front lower end of the front pillar 11 to the rear lower end of the rear pillar 12 via 26 the roof side rail 13 to reinforce the front pillar 11, the roof side rail 13, and the rear pillar 12. In other words, in the side panel 2, upper edges 1*d* of the front door opening section 1*b* and the rear door opening section 1*c* and an upper edge portion 1*r* of the rear window glass opening section 1*m* are reinforced by the ridge line 2*a*.

<Front Door Opening Section and Rear Door Opening Section>

As shown in FIG. 1, the front door opening section 1*b* is a door opening in which the front door 4 is arranged so as to be freely openable and closable. The rear door opening section 1*c* is a door opening in which the rear door 5 is arranged so as to be freely openable and closable.

<Front Window Opening and Rear Window Opening>

A front window opening 1*i* (window opening) is an opening portion (window frame portion) in which a window glass of the front door 4 is arranged. A rear window opening 1*j* (window opening) is a window opening portion (window frame portion) in which a window glass of the rear door 5 is arranged.

<Front Door and Rear Door>

Figure 2:
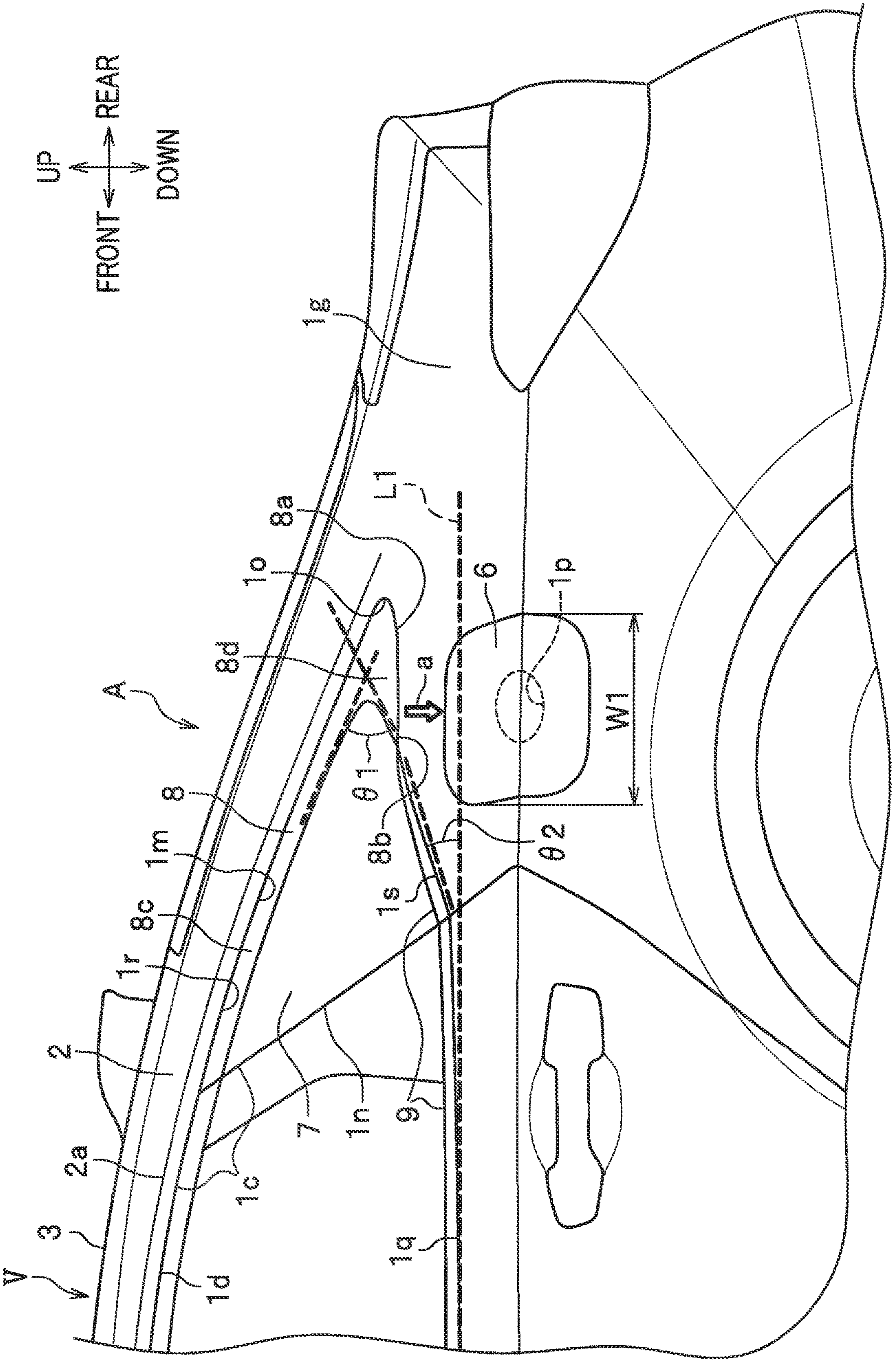
FIG. 2 is an enlarged schematic side view of a main part showing the vehicular side structure according to the embodiment of the present invention.

The front door 4 and the rear door 5 have window openings (front window opening 1*i* and rear window opening 1*j*), respectively. As shown in FIG. 1, window opening lower end portions 1*q* of the front and rear window openings 1*i* and 1*j* are formed substantially linearly in the front-rear direction. As shown in FIG. 2, the window opening lower end portion 1*q* and the fuel lid 6 (covering section) are located at the same height in the up-down direction. In other words, the fuel lid 6 is arranged on an extension line L1 of the window opening lower end portion 1*q*. Therefore, the upper side of the fuel lid 6 is arranged above the extension line L1 of the window opening lower end portion 1*q*.

The window opening lower end portions 1*q* of the 26 front and rear window openings 1*i* and 1*j* are also at the same height as the lower front end portion of the rear window glass opening section 1*m*. The weather strip 9 is attached to the window opening lower end portion 1*q* and a transition section 1*s* of the rear window glass opening section 1*m* to be described below.

<Rear Window Glass Opening Section>

As shown in FIG. 2, the rear window glass opening section 1*m* (window opening) is a window frame portion to which the rear quarter window 7 is attached. The molding member 8 is attached to the upper edge portion 1*r* and a rear end portion 1*o* of the rear window glass opening section 1*m*, and also to the upper edges 1*d* of the front and rear door opening sections 1*b* and 1*c*. Therefore, the rear quarter window 7 is mounted on the upper edge portion 1*r* of the rear window glass opening section 1*m* with the molding member 8 interposed therebetween. The rear window glass opening section 1*m* is formed of an opening formed in a substantially triangular shape.

More specifically, the upper edge portion 1*r* of the rear window glass opening section 1*m* is inclined downward from the upper edge 1*d* of the rear door opening section 1*c* toward the rear end portion 1*o* of the rear window glass opening section 1*m*. A front end portion 1*n* of the window opening lower end portion 1*q* of the rear window glass opening section 1*m* coincides with the rear end portion of the rear door opening section 1*c* and is inclined downward toward the rear side. At the lower end of the front end portion 1*n* of the window opening lower end portion 1*q*, the transition section 1*s* is formed, which is inclined upward from the rear end of the window opening lower end portion 1*q* toward the rear side. An inclination angle θ2 of the transition section 1*s* with respect to the extension line L1 of the window opening lower end portion 1*q* is an acute angle. The rear side of the transition section 1*s* of the rear window glass opening section 1*m* is formed horizontally from the rear end portion of the transition section 1*s* toward the rear end portion 1*o*.

Here, the "window opening" described in the appended claims is a portion in which the window glass is arranged, and includes the front window opening 1*i*, the rear window opening 1*j*, and the rear window glass opening section 1*m*. The window opening section (front window opening 1*i*, rear window opening 1*j*, and rear window glass opening section 1*m*) and the molding member 8 are arranged on the outer surface 1*g* of the vehicle V.

<Rear Quarter Window>

The rear quarter window 7 is a substantially triangular window glass attached to the rear window glass opening section 1*m*. The rear quarter window 7 may be made of resin or glass, and the material thereof is not particularly limited.

<Molding Member>

As shown in FIG. 1, the molding member 8 is a resin decorative member extended in a substantially strip shape in the front-rear direction when viewed from the side. The molding member 8 has a plated surface. The molding member 8 is disposed from the front end portion 1*n* of the window opening lower end portion 1*q* to the rear end portion to of the rear window glass opening section 1*m*, with the upper edges 1*d* of the front and rear door opening sections 1*b* and 1*c* interposed therebetween. The molding member 8 is extended in the substantially front-rear direction in parallel to the ridge line 2*a*.

As shown in FIG. 2, the molding member 8 has its molding upper section 8*c* provided at the entire upper edge portion 1*r* and the rear end portion to of the rear window glass opening section 1*m* in the rear quarter window 7 and the rear window glass opening section 1*m* (window opening). Thus, the molding member 8 is provided in a part of the outer periphery of the rear window glass opening section 1*m*.

The molding upper section 8*c* is formed obliquely downward along the rear quarter window 7 and the upper edge portion 1*r* of the rear window glass opening section 1*m* from the front end portion to the rear end portion to of the upper edge portion 1*r* of the rear window glass opening section 1*m*.

A molding lower end portion 8*a* is horizontally formed from the rear end portion to of the rear window glass opening section 1*m* to the upper rear end of the transition section 1*s*. A front end 8*b* of the molding lower end portion 8*a* that forms the lower edge of the molding member 8 is positioned above the fuel lid 6 (covering section). Here, "above the fuel lid 6 (covering section)" means that the front end 8*b* is positioned on a horizontal width W1 of the fuel lid 6.

The molding lower end portion 8*a* and the window opening lower end portion 1*q* are connected by the transition section 1*s* that transitions upward toward the molding lower end portion 8*a*.

A bend section 8*d* that is bent in a substantially V shape is formed at the rear end portion to where the molding upper section 8*c* and the molding lower end portion 8*a* intersect. The molding upper section 8*c* and the molding lower end portion 8*a* of the molding member 8 are connected so as to form an acute angle θ1 in the bend section 8*d* at the rear end portion to of the rear window glass opening section 1*m*. The bend section 8*d* is arranged at the center of the rear end portion of the rear quarter window 7 when viewed from the side. The bend section 8*d* is arranged above the fuel lid 6 (covering section).

<Fuel Lid>

The fuel lid 6 (covering section) is a lid member that opens and closes the refueling port 1*p*. The fuel lid 6 is arranged at a position overlapping the extension line L1 of the window opening lower end portion 1*q*. That is, the transition section 1*s* is formed below the rear window glass opening section 1*m* and the molding lower end portion 8*a* is arranged at a higher position, so that the fuel lid 6 can be disposed high up to the position overlapping the extension line L1 of the window opening lower end portion 1*q*. The rear window glass opening section 1*m* (window opening) is positioned above the fuel lid 6. The fuel lid 6 is arranged along the molding lower end portion 8*a* in the vicinity of the molding lower end portion 8*a*.

The refueling port 1*p* may be either a capless refueling port type or a refueling port type with a cap.

<<Effects of Vehicular Side Structure>>

Next, effects of the vehicular side structure A according to the embodiment of the present invention will be described with reference to the drawings.

For example, when the vehicle V is stopped, rainwater falling above the fuel lid 6 flows directly downward (a-arrow direction) and flows down through the surface of the fuel lid 6 as shown in FIG. 2. In this case, the vehicle inner side of the fuel lid 6 is sealed by a sealing material (not shown), and thus the rainwater does not enter into the fuel lid 6.

Figure 3:
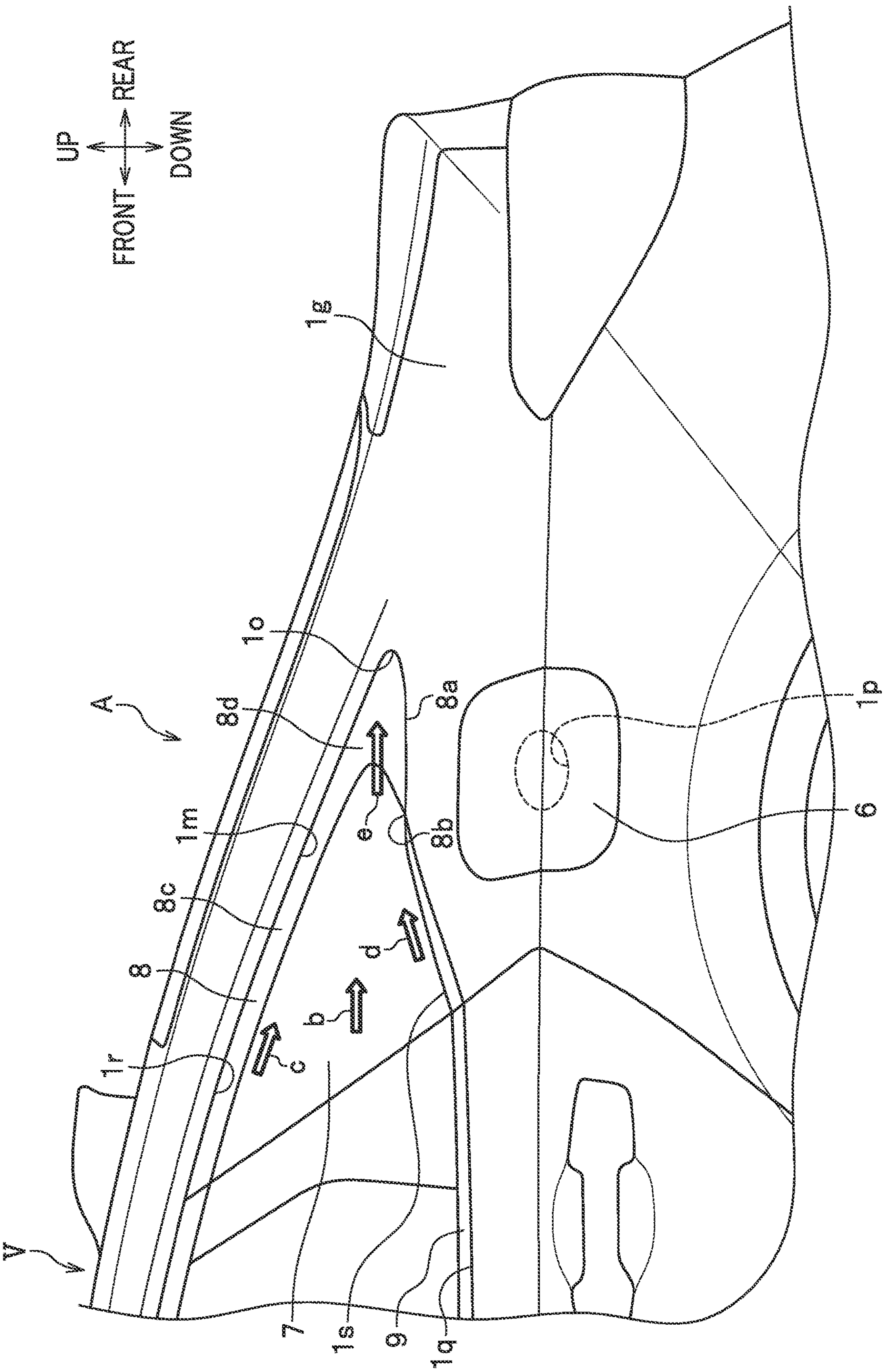
FIG. 3 is another enlarged schematic side view of the main part showing the vehicular side structure according to the embodiment of the present invention.

While the vehicle V is traveling, the rainwater falling on the rear quarter window 7 flows rearward (b-arrow direction) due to traveling wind as shown in FIG. 3. In this case, the rainwater falling on an upper portion of the rear quarter window 7 is guided by the molding upper section 8*c* of the molding member 8 and flows obliquely rearward and downward (c-arrow direction) toward the bend section 8*d* along the molding upper section 8*c*.

The rainwater falling on a lower portion of the rear quarter window 7 is guided by the transition section 1*s* and flows obliquely rearward and upward (d-arrow direction) toward the bend section 8*d* along the transition section 1*s*. In other words, the rainwater falling on the lower portion of the rear quarter window 7 is guided by the transition section 1*s* and flows obliquely rearward and upward (d-arrow direction) by the traveling wind so as to move away from the fuel lid 6.

Therefore, the rainwater falling on the rear 6 quarter window 7, while the vehicle V is traveling, is collected in the substantially V-shaped bend section 8*d*, and then flows rearward (e-arrow direction) over the bend section 8*d*. Therefore, the rainwater does not flow to the fuel lid 6. As a result, even if the fuel lid 6 is pulled to the outside of the vehicle by the traveling wind and the seal is loosened, the rainwater can be prevented from entering into the fuel lid 6.

As shown in FIG. 2, the fuel lid 6 is disposed at a position overlapping the extension line L1 of the window opening lower end portion 1*q*. Therefore, the refueling port 1*p* that is a fuel filler neck inside the fuel lid 6 can be disposed at a position higher than the window opening lower end portion 1*q*.

Therefore, when fuel is supplied through the refueling port 1*p*, the potential energy is larger than that of a case where the fuel lid 6 is located below the extension line L1 of the window opening lower end portion 1*q*, thus allowing the fuel to smoothly flow into the fuel tank.

As described above, the vehicular side structure A according to the embodiment of the present invention includes: the fuel lid 6 (covering section) that covers the refueling port 1*p* provided in the vehicle V; and the rear window glass opening section 1*m* (window opening) that communicates the inside and outside of the vehicle V, as shown in FIG. 2. The rear window glass opening section 1*m* has the substantially linearly formed window opening lower end portion 1*q*, and the window opening lower end portion 1*q* and the fuel lid 6 are positioned at the same height in the up-down direction. The rear window glass opening section 1*m* is positioned above the fuel lid 6.

According to the above configuration, in the vehicular side structure A, the window opening lower end portion 1*q* and the fuel lid 6 are positioned at the same height, and the rear window glass opening section 1*m* is positioned above the fuel lid 6. Thus, the setting for both the fuel lid 6 and the rear window glass opening section 1*m* can be achieved. Therefore, in the vehicular side structure A, the fuel lid 6 can be disposed at a higher position than a case where the fuel lid 6 is located below the window opening lower end portion 1*q*. Thus, space efficiency can be improved.

Since the fuel lid 6 that covers the refueling port 1*p* can have an increased distance from the fuel tank (not shown) in the upward direction, the potential energy of the fuel through the refueling port 1*p* can be increased. Therefore, the fuel can be effectively injected. As a result, the fuel can be prevented from overflowing from the refueling port 1*p* during refueling.

As shown in FIG. 2, the molding member 8 is attached to at least the upper edge portion 1*r* of the rear window glass opening section 1*m* (window opening), and the front end 8*b* of the molding lower end portion 8*a* that forms the lower edge of the molding member 8 is positioned above the fuel lid 6 (covering section).

According to the above configuration, when the molding lower end portion 8*a* is extended forward too much, a larger vertical width is required for the excessively extended part. In this case, the layout of the fuel lid 6 may be affected, but since the excessively extended part is up to above the fuel lid 6, the layout of the fuel lid 6 is not affected.

As shown in FIG. 2, the molding lower end portion 8*a* and the window opening lower end portion 1*q* are connected by the transition section 1*s* that transitions upward toward the molding lower end portion 8*a*.

According to the above configuration, the vehicular side structure A has the transition section 1*s* that connects the molding lower end portion 8*a* with the window opening lower end portion 1*q*. Therefore, even if the height of the molding lower end portion 8*a* is different from that of the window opening lower end portion 1*q*, the molding lower end portion 8*a* and the window opening lower end portion 1*q* do not form a step shape. Therefore, the appearance can be improved.

As shown in FIG. 2, the rear window glass opening section 1*m* (window opening) and the molding member 8 are positioned on the outer surface 1*g* of the vehicle V, and the molding upper section 8*c* and the molding lower end portion 8*a* of the molding member 8 are connected so as to form an acute angle in the bend section 8*d* at the rear end portion 1*o* of the rear window glass opening section 1*m*. The bend section 8*d* is positioned above the fuel lid 6 (covering section).

Here, "above the fuel lid 6 (covering section)" means that the bend section 8*d* is located vertically upward within a width range in the horizontal direction of the fuel lid 6.

According to the above configuration, even if the front end 8*b* of the molding lower end portion 8*a* is positioned above the fuel lid 6, rainwater falling on the rear quarter window 7 during traveling can be blown rearward from the bend section 8*d* by the traveling wind. Therefore, at least during traveling, the rainwater can be prevented from excessively flowing into the fuel lid 6, and the seal of the fuel lid 6 under a load of the traveling wind can be suppressed from being exposed to rainwater.

[Modification]

Although the embodiment of the present invention has been described above, the present invention is not limited to the above embodiment and can be appropriately modified without departing from the scope of the invention.

For example, although the description has been given of the case where the fuel lid 6 (covering section) is disposed on the outer surface 1*g* on the left side of the vehicle body 1 as shown in FIG. 1, the fuel lid 6 may also be disposed on the right side surface of the vehicle body 1.

Although the description has been given of the fuel lid 6 (covering section) that covers the refueling port 1*p* as an example, the fuel lid 6 may cover the charging port of an electric vehicle or the like.

REFERENCE SIGNS

1: vehicle body; 1*g*: outer surface (side surface of vehicle); 1*i*: front window opening (window opening); 1*j*: rear window opening (window opening); 1*m*: rear window glass opening section (window opening); 1*o*: rear end portion of window opening section; 1*p*: refueling port; 1*q*: window opening lower end portion; 1*r*: upper edge portion; 1*s*: transition section; 4: front door; 5: rear door; 6: fuel lid (covering section); 8: molding member; 8*a*: molding lower end portion; 8*b*: front end of molding lower end portion; 8*c*: molding upper section; 8*d*: bend section; V: vehicle

What is claimed is:

1. A vehicular side structure comprising:

a covering section that covers a refueling port provided in a vehicle; and a window opening that communicates an inside and an outside of the vehicle, wherein the window opening has a substantially linearly formed window opening lower end portion, and the window opening lower end portion and the covering section are positioned at the same height in an up-down direction, the window opening is positioned above the covering section, the window opening has a molding member attached at least to its upper edge portion, a front end of a molding lower end portion that forms a lower edge of the molding member is positioned above the covering section, and the molding lower end portion and the window opening lower end portion are connected by a transition section that transitions upward toward the molding lower end portion.

2. The vehicular side structure according to claim 1, wherein the window opening and the molding member are positioned on an outer surface of the vehicle, a molding upper section and the molding lower end portion of the molding member are connected so as to form an acute angle in a bend section at a rear end portion of the window opening, and the bend section is positioned above the covering section.

* * * * *